United States Patent [19]
Zamat et al.

[11] Patent Number: 5,983,085
[45] Date of Patent: Nov. 9, 1999

[54] METHOD AND APPARATUS THAT COMPENSATES FOR OUTPUT POWER VARIATIONS IN A TRANSMITTER BY USING SCALING FACTORS TO SCALE THE BASEBAND INPUT SIGNAL

[75] Inventors: Hassan Zamat, San Diego, Calif.; Kumud Patel, Germantown; Brian Fair, Rockville, both of Md.

[73] Assignee: Hughes Electronics Corporation, El Segundo, Calif.

[21] Appl. No.: 08/719,759

[22] Filed: Sep. 25, 1996

[51] Int. Cl.⁶ .................................................. H04B 01/04
[52] U.S. Cl. ..................... 455/127; 455/126; 455/115; 455/123
[58] Field of Search .................................... 455/127, 126, 455/115, 90, 123, 67.4; 375/222, 295, 296, 219

[56] References Cited

U.S. PATENT DOCUMENTS

| | | | |
|---|---|---|---|
| 5,369,637 | 11/1994 | Richardson et al. | 455/93 X |
| 5,524,285 | 6/1996 | Wray et al. | 455/126 |
| 5,740,520 | 4/1998 | Cyze et al. | 455/127 X |

*Primary Examiner*—Wellington Chin
*Assistant Examiner*—Philip J. Sobutka
*Attorney, Agent, or Firm*—John T. Whelan; Michael W. Sales

[57] ABSTRACT

In a base transceiver station in a cellular network, a digital signal processor generates a baseband input signal, which is converted to analog and transmitted by a transmitter at radio frequency. In accordance with the present invention, the baseband input signal is scaled by a selected factor from a predetermined table of scaling factors. The scaling factors are determined based on measured output power characteristics of the transmitter and provide frequency compensation caused by filtering ripple and/or attenuation compensation caused by uncertainties in internal attenuators.

32 Claims, 4 Drawing Sheets

| Transmit Frequency | Frequency Compensation Factor (dB) |
|---|---|
| $F_L - F_1$ | 1.6 |
| $F_1 - F_2$ | 1.2 |
| $F_2 - F_3$ | 0.8 |
| $F_3 - F_4$ | 0.4 |
| $F_4 - F_5$ | 0.0 |
| $F_5 - F_6$ | 0.4 |
| $F_6 - F_7$ | 0.8 |
| $F_7 - F_8$ | 1.2 |
| $F_8 - F_9$ | 1.6 |
| $F_9 - F_{10}$ | 1.2 |
| $F_{10} - F_{11}$ | 0.8 |
| $F_{11} - F_{12}$ | 0.4 |
| $F_{12} - F_{13}$ | 0.0 |
| $F_{13} - F_{14}$ | 0.4 |
| $F_{14} - F_{15}$ | 0.8 |
| $F_{15} - F_{16}$ | 1.2 |
| $F_{16} - F_U$ | 1.6 |

FIG. 4

| Programmed Attenuation (dB) | Attenuation Compensation (dB) |
|---|---|
| 0.0 | 0.5 |
| 2.0 | -1.2 |
| 4.0 | -0.1 |
| 6.0 | 0.2 |
| . | . |
| . | . |
| 30 | -0.8 |

FIG. 5

METHOD AND APPARATUS THAT COMPENSATES FOR OUTPUT POWER VARIATIONS IN A TRANSMITTER BY USING SCALING FACTORS TO SCALE THE BASEBAND INPUT SIGNAL

BACKGROUND OF THE INVENTION

1. Field of the Invention

The present invention relates to power compensation in transmitters and, more particularly, to attenuation and frequency compensation in a radio frequency transmitter in a cellular network.

2. Description of Related Art

In radio frequency transmitters, the power of the output signal may vary due to filtering ripple and uncertainties in internal attenuators. In order to compensate for these power variations, external variable attenuators may be provided. However, these attenuators can only provide a coarse adjustment that is inadequate to compensate for power variations. An analog attenuator with a digital to analog convertor connected to the input of the transmitter may also be provided. Although this allows for a slightly finer adjustment, it adds complexity to the system and increases the expense due to the extra components. A closed loop could also be implemented to provide power adjustment but this would also be expensive and would not provide adequate compensation over a large dynamic range.

Therefore, there remains a need for a method and apparatus for compensating for output power variations in a transmitter without increasing cost or adding additional components.

SUMMARY OF THE INVENTION

In a cellular transceiver station, a digital signal processor generates a baseband input signal, which is converted to analog and transmitted by a transmitter at radio frequency. In accordance with the present invention, the baseband input signal is scaled by a selected factor from a predetermined table of scaling factors. The scaling factors are determined based on measured output power characteristics of the transmitter and provide frequency compensation caused by filtering ripple and attenuation compensation caused by uncertainties in internal attenuators. Because the compensation is implemented via existing processors, no additional components are needed and the invention is inexpensive to implement.

According to one aspect of the present invention, an apparatus for compensating for output power variations in a transmitter comprises memory means for storing a predetermined table of scaling factors based on actual output power variations in the transmitter. The apparatus further comprises signal processing means for generating a baseband input signal and scaling the baseband input signal by a selected factor from the table. Conversion means connected to the signal processing means receives the scaled baseband input signal, converts the signal to a radio frequency signal and provides the signal to the transmitter.

According to another aspect of the present invention, an apparatus for compensating for output power variations in a transmitter comprises a digital signal processor for generating a baseband input signal and scaling the baseband input signal by a selected scaling factor from a predetermined table of scaling factors to compensate for power variations in the transmitter. A digital filter and mixer receives the scaled baseband signal and converts the signal to a first intermediate frequency. A digital to analog converter converts the signal to an analog signal, which is then up-converted to a second intermediate frequency. A mixer then mixes the signal with the output of a synthesizer to convert the signal to a radio frequency within a transmit band and provides the signal to the transmitter.

According to yet another aspect of the present invention, a method of compensating for output power variations in a transmitter comprises the steps of creating a table of scaling factors based on actual output power variations in the transmitter, scaling a baseband input signal by a selected factor from the table, providing the scaled baseband signal to a modulator, modulating the signal and providing the modulated signal to the transmitter.

The table may provide for frequency compensation, attenuation compensation or both. For frequency compensation, the table is generated by measuring the frequency response of the transmitter within a selected transmit frequency band and determining the frequency range within that band with the highest power output. The power output at other frequencies within the band are then measured and a power compensation factor to boost the power output to a range close to the highest power output is calculated. A corresponding scaling factor for each of the power compensation factors is then calculated.

The transmitter may include a programmable attenuator having a plurality of attenuation settings. To compensate for uncertainties in the programmable attenuator, an attenuation correction table is generated by measuring the actual power attenuation for each attenuation setting and calculating an attenuation correction factor based on the difference between the actual and programmed attenuation. A corresponding scaling factor for each attenuation correction factor is then calculated.

BRIEF DESCRIPTION OF THE DRAWING(S)

FIG. 4 is an exemplary frequency compensation table of the present invention;

FIG. 5 is an exemplary attenuation compensation table of the present invention.

DESCRIPTION OF THE PREFERRED EMBODIMENT(S)

The present invention may be implemented, for example, to compensate for output power variations in a transmitter which is part of a base transceiver station in a cellular network, such as a wireless telephony network. In a wireless telephony network, several base transceiver stations are connected to a central switching office which serves as an interface between the base transceiver stations and a public wired telephone network or other wireless telephone switching offices. The base transceiver stations also communicate with mobile telephones or a multiscriber telephone system (such as an office or hotel) over selected radio frequency channels. For purposes of this invention, only the transmitting mode (rather than the receiving mode) of the base transceiver station will be described.

Figure 1:
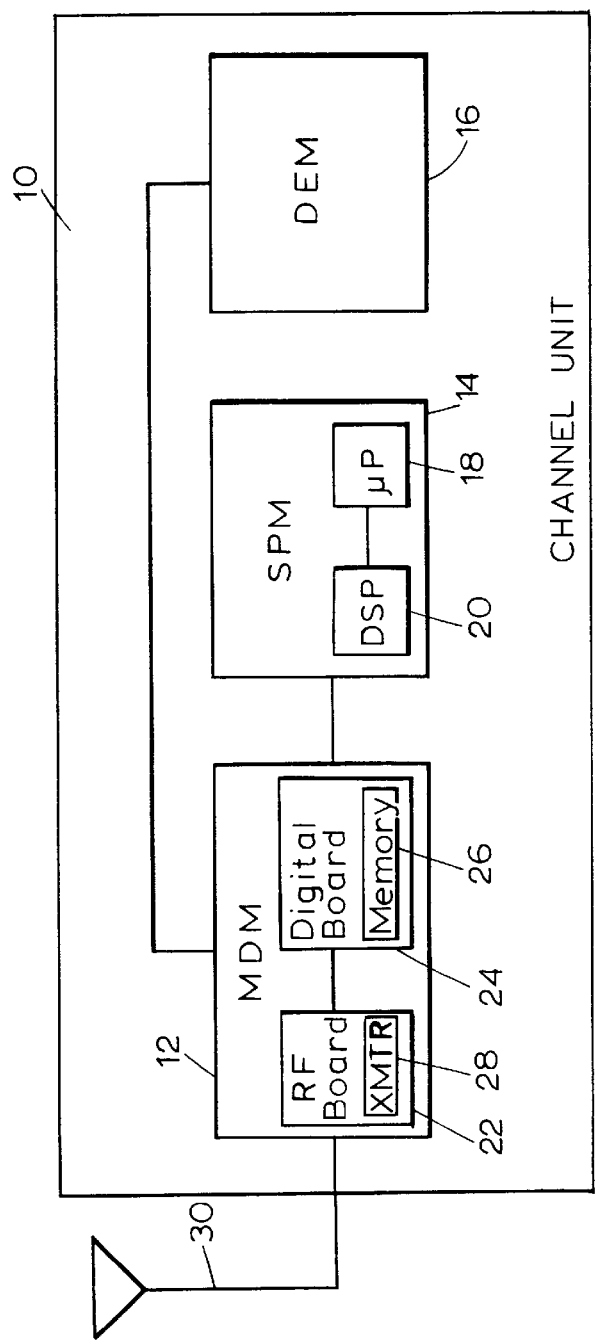
FIG. 1 is block diagram of a channel unit in a cellular network for implementing a preferred embodiment of the present invention.

Referring to FIG. 1, a channel unit 10 of the transceiver station comprises a modulator downconverter module (MDM) 12, a slot processing module (SPM) 14 and a demodulator module (DEM) 16. The slot processing module 14 includes a microprocessor 18 which is the central control processor of the channel unit 10 and at least one transmit digital signal processor (DSP) 20. The slot processing module 14 may also include one or more receive digital signal processors (not shown). The modulator downconverter module 12 includes a radio frequency (RF) board 22 and a digital board 24, including a memory 26. The RF board 22 includes at least one transmitter 28 which transmits a radio frequency signal via the antenna 30. The demodulator 16, in general, demodulates data received from the modulator downconverter module 12 but is not used in transmitting mode.

Figure 2:
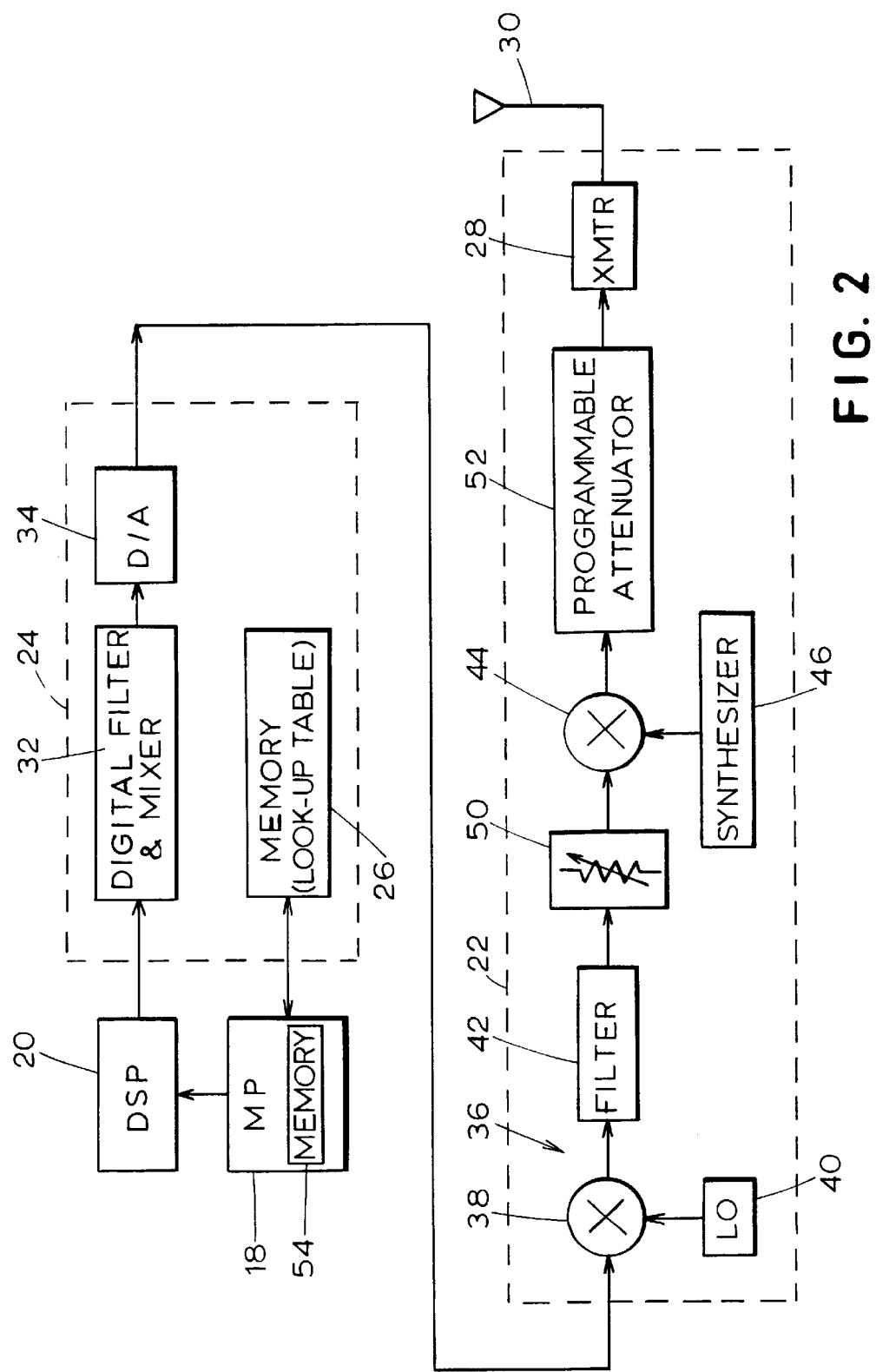
FIG. 2 is a block diagram of the components of the modulator downconverter module (MDM) and slot processing module (SPM) for implementing a preferred embodiment of the present invention.

FIG. 2 is a detailed block diagram of the components of the modulator downconverter module (MDM) 12 and slot processing module (SPM) 14 for implementing a preferred embodiment of the present invention. The digital signal processor (DSP) 20 which resides in the slot processing module 14 generates a baseband input signal which is provided to a digital filter and mixer 32. In a preferred embodiment, a quadrature modulation scheme is used such that the digital signal processor 20 provides inphase (I) and quadrature phase (Q) samples as the baseband input signal. However, other types of digital baseband input signals could be used in accordance with the present invention.

The digital filter and mixer 32 filters the baseband input signal using a digital finite impulse response (FIR) filter, interpolates for a higher sampling rate, and then mixes the samples to a first intermediate frequency (IF) of 4.86 MHz. The samples are then provided to a high speed digital to analog (D/A) converter 34, which converts it to an analog signal. The analog signal may then be band pass filtered to remove any harmonics or spurious signals.

The resulting analog signal is then provided to an up-converter 36, which comprises a first mixer 38, a local oscillator 40 and a filter 42. The mixer 38 combines the analog signal (at the first intermediate frequency of 4.86 MHz) with the output of the local oscillator 40, which preferably operates at a frequency of 134.91 MHz. The mixed signal is then passed through the filter 42, which is preferably a SAW filter with a center frequency of 130.05 MHz, resulting in a signal at a second intermediate frequency of 130.05 MHz.

A second mixer 44 then mixes the 130.05 MHz signal with the output of a synthesizer 46 operating at a frequency between 738 and 763 MHz. This transforms the signal to a radio frequency signal within a transmit band or channel. (Generally, radio frequency channels are between 869 and 894 MHz in 30 KHz increments.) The signal is then transmitted by the transmitter 28 via the antenna 30. It is understood by those skilled in the art that the transmitter 28 includes appropriate filters and amplifiers for transmission of the signal.

The modulator downconverter module 12 also includes a manual power adjuster 50, such as a variable resistor, and a programmable attenuator 52. The manual power adjuster 50 is normally used to initially calibrate the power output of the transmitter 28 in the modulator downconverter module 12. The manual power adjuster 50 can generally adjust the output power by about 2–3 dBs.

In a preferred embodiment, the programmable attenuator 52 provides for attenuation from 0 dB to 30 dB in 2 dB steps. The attenuation provided by the programmable attenuator is set by the microprocessor 18. The programmable attenuator 52 allows the output power to be attenuated (in 2 dB steps) if a lower power signal is suitable for transmission. The programmable attenuator 52, however, does not permit fine tuning of the output power and also introduces uncertainties into the system. For example, a programmed 4.0 dB attenuation may actually provide 4.2 dB attenuation.

Transmitter output power compensation is especially important in wireless telephony networks which must conform to telecommunications industry standards and where high powered signals may interfere with other communications. The present invention provides both frequency response compensation caused by the imperfections in the filters and/or attenuation compensation caused by the uncertainties in the programmable attenuator 52. This is accomplished by generating one or more look-up tables of scaling factors which are applied to the baseband input signal generated by the digital signal processor 20 and provided to the digital modulator 32. The look-up tables may be stored in the memory 26, which preferably comprises a serial EEPROM, in the modulator downconverter module 12.

The microprocessor 18 (on the slot processing module 14) reads the look-up tables stored in the memory 26. In order to speed up processing, the microprocessor 18, which may be an Intel 80960CA microprocessor, may read the entire look-up tables stored in the memory 26 and store the tables in an internal memory 54. The microprocessor 18 then selects the appropriate scaling factor and provides the factor to the digital signal processor 20. The digital signal processor 20 scales the baseband input signal by the scaling factor received from the microprocessor 18 and provides the resultant scaled input signal to the digital filter and mixer 32.

Figure 3:
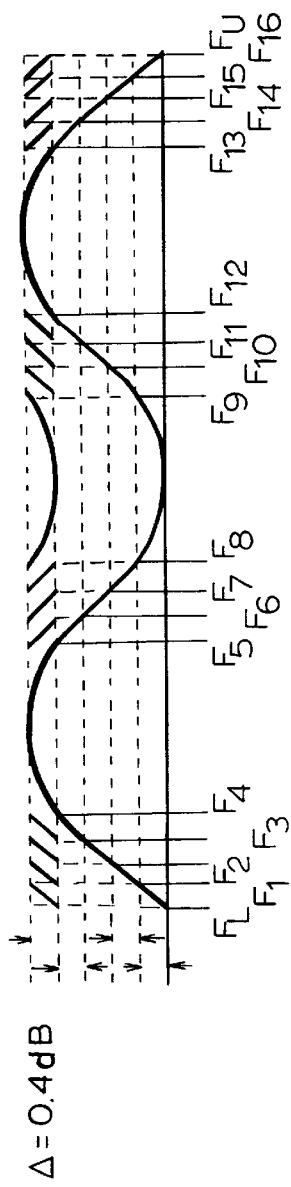
FIG. 3 is a graph of the worst case frequency response of the transmitter in a preferred embodiment of the present invention.

The look-up tables are generated based on the actual power output of the transmitter 28 measured during production testing of the modulator downconverter module 12. FIG. 3 is a graph of the worst case frequency response of the transmitter 28 of the modulator downconverter module 12, wherein the x-axis represents the frequency of the transmitted signal and the y-axis represents the power of the transmitted signal. In a preferred embodiment, the optimum power output of the transmitter 28 is 9 dBm, which is the power output needed for effective cellular transmission. In the preferred embodiment, the output power should be maintained within 0.4 dB of the optimum power output across the entire transmit frequency band (between upper frequency $F_U$ and lower frequency $F_L$). The 9 dBm optimum power output with 0.4 dB variance could be altered in accordance with the present invention.

As illustrated in FIG. 3, the power output in several frequency ranges (i.e. between $F_L$ and $F_4$; $F_5$ and $F_{12}$; and $F_{13}$ and $F_U$) falls outside of the allowable variance of 0.4 dB of the optimum power output. Thus, a frequency compensation table is generated which provides the appropriate compensation to maintain the power level within 0.4 dB of the 9 dBm optimum power output regardless of the transmit frequency within the transmit band being used.

During production test of the modulator downconverter module 12, the baseband input signal is initially digitally attenuated by the digital signal processor 20 by −3.0 db and the output power is adjusted to the 9 dBm optimum level. This allows for appropriate scaling of the baseband input signals. The frequency spectrum is then scanned to determine the frequency range(s) with the highest power output (i.e., between $F_4$ and $F_5$ and $F_{12}$ and $F_{13}$ on FIG. 3). The upper frequency ($F_U$) and lower frequency ($F_L$) of the transmit band are known. The frequency compensation table is completed by determining the frequencies corresponding to the 0.4 db steps in power output. If more than one transmit frequency band or channel is used, a separate frequency compensation table for each channel will be generated and stored in the memory 26.

FIG. 4 is an exemplary frequency compensation table based on the worst case frequency response of FIG. 3. As shown in FIG. 4, if the transmit frequency is between $F_L$ and $F_1$, a frequency compensation factor of 1.6 db gain is provided. If the transmit frequency is between $F_1$ and $F_2$, a compensation factor of 1.2 db gain is provided. If the transmit frequency is between $F_4$ and $F_5$, a frequency compensation of no gain (0.0 dB) is provided. If consecutive frequencies are equal to the upper or lower frequencies of the frequency band, then no information is stored corresponding to those frequencies.

An attenuation compensation table which provides for attenuation compensation due to the uncertainties in the programmable attenuator 52 may also be generated. During production test of the modulator downconverter module 12, the programmable attenuator 52 is programmed for each attenuation setting (from 0.0 to 30 dB in 2.0 dB steps). For each setting, the actual attenuation is measured and a corresponding correction factor is calculated. For example, if a programmed attenuation setting of 4.0 db actually provides an attenuation of 4.1 db, a 0.1 dB amplification compensation factor will be provided. In the preferred embodiment, because the attenuation is in 2.0 dB steps, the maximum attenuation correction is ±2.0 dB. An exemplary attenuation compensation table is shown in FIG. 5.

Once the frequency and attenuation compensation factors are determined, a corresponding scaling factor is calculated. In the preferred embodiment, a value of 800 Hex was chosen as the 0 dB reference (i.e., assuming a 12 bit input signal, the halfway point between 0 and FFF hex). The scaling factor is then calculated as follows:

$$\text{compensation (dB)} = 20\log\left(\frac{\text{Scaling Factor}}{800 \text{ hex}}\right) \quad \text{(Eq. 1)}$$

Therefore, $$\text{Scaling Factor} = 10^{\left(\frac{\text{compensation(dB)}}{20}\right)} \cdot (800 \text{ hex}) \quad \text{(Eq. 2)}$$

For example, if the compensation needed is an attenuation of 1.0 dB, the scaling factor is calculated (using Equation 2) as follows:

$$\text{Scaling Factor} = 10^{(-1/20)} \cdot (800 \text{ hex})$$

$$= 1825$$

$$= 721 \text{ hex}$$

Figure 6:
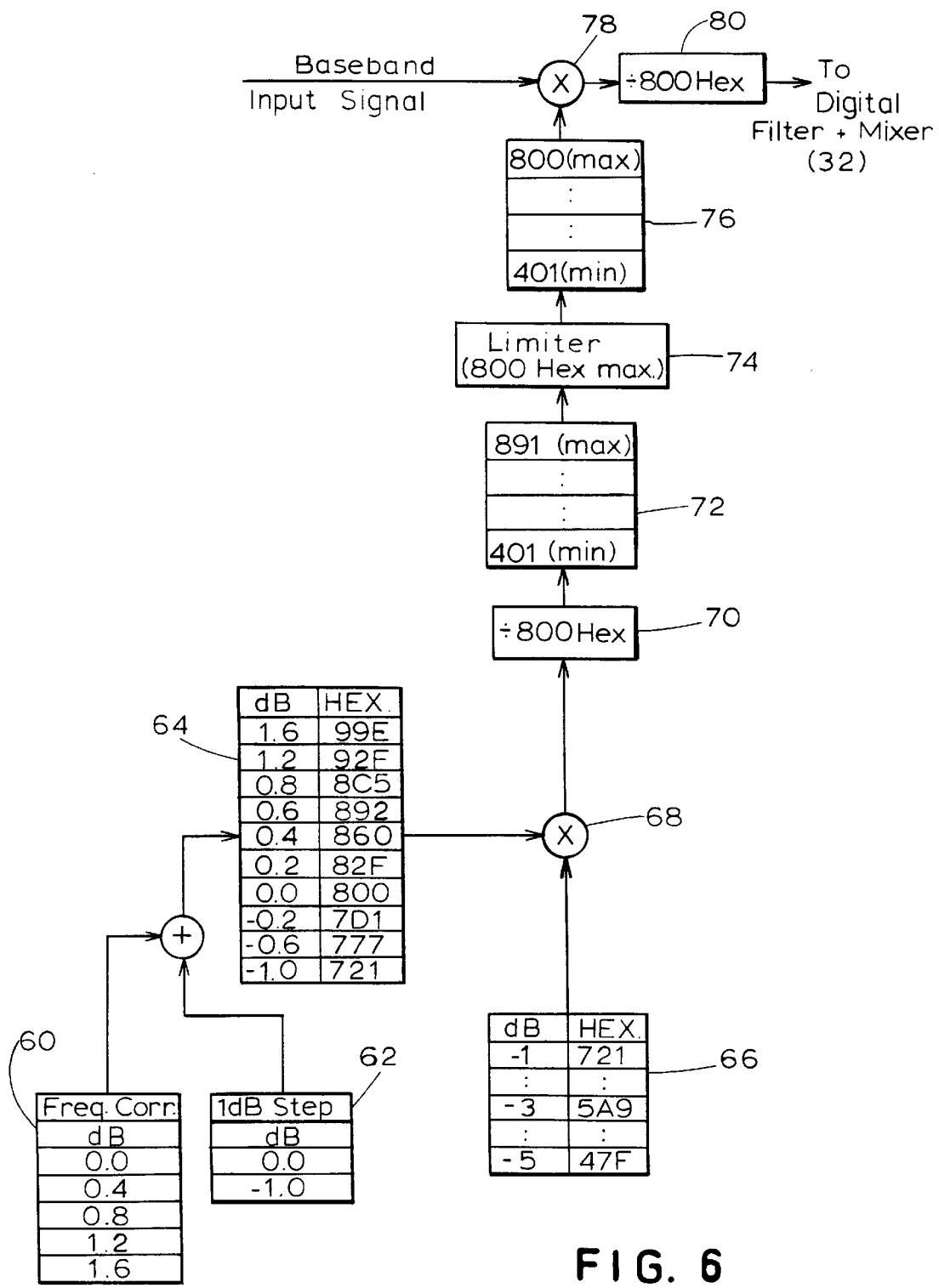
FIG. 6 is a diagram of the look-up tables of scaling factors and operations performed in the SPM to scale the baseband input signal to compensate for output power variations in the transmitter of the present invention.

FIG. 6 is a diagram of the look-up tables of the scaling factors stored in the memory 26 and the operations performed by the digital signal processor 20 to scale the baseband input signal by the appropriate scaling factor before the signal is provided to the digital filter and mixer 32. A first table 60 contains the needed power compensation (from 0.0–1.6 dB in 0.4 dB increments) for the range of transmit frequencies in a given channel, as described above in connection with FIGS. 3 and 4.

In the preferred embodiment, an optional second table 62 is also provided to allow for finer adjustment than is provided for by the programmable attenuator 52. As explained above, the programmable attenuator 52 can only provide compensation in 2.0 dB steps. Therefore, the second table 62 allows for compensation in 1.0 dB steps. For example, to provide 3.0 dB attenuation, the programmable attenuator 52 is set to 2.0 dB and then the second table 62 is used to provide an additional 1.0 dB attenuation, resulting in a net attenuation of 3.0 dB. The second table 62, however, only adjusts the step size (from 2.0 dB steps to 1.0 dB steps) and does not compensate for the uncertainties in the programmable attenuator 52.

The compensation values from the first table 60 and the second table 62 are added together to generate a frequency correction table 64, which contains a range of compensation factors from −1.0 dB to 1.6 dB. The corresponding scaling factors are calculated using Equation 2, as set forth above.

In a preferred embodiment, the frequency correction table 64 (which is relatively small) containing the compensation factors and corresponding hex values is provided to the digital signal processor 20. The microprocessor 18 provides the selected frequency compensation factor (from table 60) to the digital signal processor 20. The digital processor 20 adds the selected factors to the selected attenuation step from table 62. The digital signal processor 20 then looks up the hex scaling factor corresponding to the sum in the table 64.

An attenuation correction table 66 is also generated. In the preferred embodiment, the nominal value in the attenuation correction table is −3.0 dB (corresponding to no correction) because the baseband input signal was initially attenuated by −3.0 dB to provide the optimum power output of 9.0 dBm. Because the maximum attenuation correction is ±2.0 dB, the attenuation correction factors range from −1.0 dB to −5.0 dB. The corresponding scaling factors are also calculated using Equation 2, as set forth above.

In a preferred embodiment, the attenuation correction table 66 is stored by the microprocessor 18. The microprocessor 18 determines the required attenuation correction, looks up the corresponding hex scaling factor in the table 66 and provides the hex scaling factor to the digital signal processor 20. Because the attenuation correction may contain many values, it is not practical for the digital signal processor to perform the table look up.

The scaling factors from the frequency correction table 64 and the attenuation correction table 66 are then multiplied together by the digital signal processor 20, as represented by multiplier 68. The result is then divided by 800 hex, which was used as the 0 dB reference, to normalize the result (block 70). The resulting scaling factors range from 401 to 891 hex (as represented by table 72). The scaling factors are then passed through a limiter 74 which restricts the maximum value of the scaling factors to 800 hex, resulting in scaling factors that range from 401 to 800 hex (as represented by table 76). As explained below, this ensures that the baseband input signals are attenuated, rather than amplified, by the scaling factors.

The digital signal processor 20 then multiplies the resultant scaling factor with the baseband input signal, as represented by multiplier 78, and divides the product by 800 hex (block 80) to normalize the

What is claimed is:

1. An apparatus for compensating for output power variations in a transmitter, comprising:

memory means for storing a predetermined table of scaling factors, wherein the scaling factors are based on actual output power variations in the transmitter and further wherein the scaling factors are used to scale a set of baseband input signals to generate a set of resulting signals, wherein each of the resulting signals has a power level that is within a variance band of an optimum power level;

signal processing means for generating the baseband input signals and for scaling each of the baseband input signals by one of the scaling factors, wherein each of the scaling factors are selected so that the power levels of the resulting signals are within the variance band of the optimum power level; and conversion means connected to the signal processing means for receiving the resulting signals, converting the resulting signals to a set of radio frequency output signals and providing the radio frequency output signals to the transmitter.

2. The apparatus of claim 1, wherein the scaling factors provide for frequency compensation based on a measured frequency response of the transmitter.

3. The apparatus of claim 1, wherein the scaling factors provide for attenuation compensation.

4. The apparatus of claim 1, further comprising a microprocessor for selecting a scaling factor from the table.

5. The apparatus of claim 1, wherein the signal processing means comprises a digital signal processor and the baseband input signal comprises inphase and quadrature phase samples.

6. The apparatus of claim 1, wherein the conversion means comprises a digital filter and mixer to convert the scaled input signal to a first intermediate frequency.

7. The apparatus of claim 6, wherein the conversion means further comprises an digital to analog converter to convert the scaled input signal to an analog signal.

8. The apparatus of claim 7, wherein the conversion means further comprises an up-converter to convert the analog signal to a second intermediate frequency.

9. The apparatus of claim 8, wherein the conversion means further comprises a mixer to combine the second intermediate frequency signal with an output of a synthesizer to generate the radio frequency signal.

10. An apparatus for compensating for output power variations in a transmitter comprising:

a digital signal processor for generating a baseband input signal and for scaling the baseband input signal by a selected scaling factor from a predetermined table of scaling factors to compensate for power variations in the transmitter;

a digital filter and mixer for receiving the scaled baseband input signal;

a digital to analog converter for converting the signal to an analog signal; and a converter for converting the signal to a radio frequency within a transmit band and providing the signal to the transmitter.

11. The apparatus of claim 10, further comprising a memory for storing the table and a microprocessor for selecting the selected scaling factor from the table.

12. The apparatus of claim 10, wherein the baseband input signal comprises inphase and quadrature phase samples.

13. The apparatus of claim 10, wherein the digital filter and mixer converts the signal to a first intermediate frequency.

14. The apparatus of claim 13, wherein the converter comprises an up-converter for converting the signal to a second intermediate frequency and a mixer for mixing the second intermediate frequency signal with an output of a synthesizer to convert the signal to radio frequency.

15. The apparatus of claim 13, wherein the up-converter comprises a mixer that mixes the signal with the output of a local oscillator and a filter for filtering the mixed signal.

16. The apparatus of claim 10, further comprising a programmable attenuator having a plurality of attenuation settings for attenuating the output power of the transmitter and wherein the scaling factors provide attenuation compensation caused by uncertainties in the programmable attenuator.

17. The apparatus of claim 10, wherein the scaling factors provide frequency compensation based on a measured frequency response of the transmitter.

18. A method of compensating for output power variations in a transmitter, comprising the steps of:

selecting a scaling factor from a predetermined table of scaling factors that are based on actual output power variations of the transmitter;

scaling a baseband input signal by the selected scaling factor to generate a scaled signal having a power level that is within a variance band of an optimum power level;

providing the scaled signal to a modulator;

modulating the scaled signal; and providing the modulated signal to the transmitter.

19. The method of claim 18, further comprising the step of creating the table of predetermined scaling factors.

20. The method of claim 19, further comprising the step of storing the table of scaling factors in a memory.

21. The method of claim 19, wherein the step of creating the table of scaling factors further comprises the steps of:

measuring a frequency response of the transmitter within a selected transmit frequency band;

determining a frequency range within the transmit band with a highest power output;

determining other frequencies within the transmit band with a power output outside of the highest power output;

calculating a power compensation factor for each of the other frequencies to boost the power output to a range close to the highest power output; and calculating a corresponding scaling factor for each of the power compensation factors.

22. The method of claim 19, wherein the transmitter includes a programmable attenuator having a plurality of attenuation settings and the step of creating the table of scaling factors further comprises the steps of:

measuring an actual power attenuation for each attenuation setting of the programmable attenuator;

calculating an attenuation correction factor based on a difference between the actual power attenuation and the attenuation setting for each attenuation setting; and calculating a corresponding scaling factor for each attenuation correction factor.

23. The method of claim 18, wherein the step of modulating the signal further comprises the steps of:

digitally mixing the signal to a first intermediate frequency;

converting the signal from digital to analog;

up-converting the signal to a second intermediate frequency; and converting the signal to a radio frequency within a transmit band.

24. An apparatus for compensating for output power variations in a transmitter, comprising:
- a memory, wherein a predetermined table of scaling factors are stored in the memory;
- a signal processor coupled to the memory, the signal processor receiving a selected one of the scaling factors from the memory and using the selected scaling factor to scale an input signal, wherein the selected scaling factor is chosen such that the scaled input signal has a power level that is within a variance band of an optimum power level; and
- a signal converter coupled to the signal processor, the signal converter receiving the scaled input signal from the signal processor and converting the scaled input signal to radio frequency signals and providing the radio frequency signals to the transmitter.

25. The apparatus of claim 24, wherein the scaling factors provide for frequency compensation based on a measured frequency response of the transmitter.

26. The apparatus of claim 24 wherein the scaling factors provide for attenuation compensation.

27. The apparatus of claim 24, further comprising a microprocessor for selecting a scaling factor from the table.

28. The apparatus of claim 24, wherein the signal processor comprises a digital signal processor and the baseband input signal comprises inphase and quadrature phase samples.

29. The apparatus of claim 24, wherein the converter comprises a digital filter and mixer and further wherein the digital filter and mixer convert the scaled input signal to a first intermediate frequency.

30. The apparatus of claim 29, wherein the converter further comprises a digital to analog converter and further wherein the digital to analog converter converts the scaled input signal to an analog signal.

31. The apparatus of claim 30, wherein the converter further comprises an up-converter and further wherein the up-converter converts the analog signal to a second intermediate frequency.

32. The apparatus of claim 31, wherein the converter further comprises a mixer and further wherein the mixer combines the second intermediate frequency signal with an output of a synthesizer to generate the radio frequency signal.

* * * * *